United States Patent
Nam et al.

(10) Patent No.: US 8,704,788 B2
(45) Date of Patent: Apr. 22, 2014

(54) ELECTROSTATIC CAPACITY TYPE TOUCH SCREEN PANEL AND METHOD OF MANUFACTURING THE SAME

(75) Inventors: Seunghee Nam, Paju-si (KR); Namkook Kim, Suwon-si (KR); Youngki Jung, Paju-si (KR)

(73) Assignee: LG Display Co., Ltd., Seoul (KR)

( * ) Notice: Subject to any disclaimer, the term of this patent is extended or adjusted under 35 U.S.C. 154(b) by 418 days.

(21) Appl. No.: 13/177,130

(22) Filed: Jul. 6, 2011

(65) Prior Publication Data
US 2012/0013554 A1    Jan. 19, 2012

(30) Foreign Application Priority Data
Jul. 14, 2010 (KR) .................. 10-2010-0067942

(51) Int. Cl.
*G06F 3/041* (2006.01)
*B05D 3/00* (2006.01)
*B05D 5/12* (2006.01)

(52) U.S. Cl.
USPC ....................................... 345/173

(58) Field of Classification Search
USPC ........... 345/173–176, 104; 178/18.06; 427/58
See application file for complete search history.

(56) References Cited

U.S. PATENT DOCUMENTS

| | | | |
|---|---|---|---|
| 2009/0309850 A1* | 12/2009 | Yang | 345/174 |
| 2010/0026661 A1* | 2/2010 | Teramoto | 345/174 |
| 2010/0128000 A1* | 5/2010 | Lo et al. | 345/174 |
| 2010/0177061 A1* | 7/2010 | Gray | 345/174 |

* cited by examiner

*Primary Examiner* — Andrew Sasinowski
(74) *Attorney, Agent, or Firm* — McKenna Long & Aldridge, LLP

(57) ABSTRACT

A touch screen panel and a method of manufacturing the same are disclosed. The touch screen panel includes a substrate, an electrode forming part positioned on the substrate, and a routing wiring part positioned on the substrate outside the electrode forming part. The electrode forming part includes a plurality of first electrode serials arranged parallel to one another in a first direction and a plurality of second electrode serials arranged to cross the first electrode serials. The routing wiring part includes a plurality of first routing wires respectively connected to the first electrode serials and a plurality of second routing wires respectively connected to the second electrode serials. A plurality of first connection patterns are formed on the same level layer as the first and second routing wires to be separated from one another.

9 Claims, 12 Drawing Sheets

ELECTROSTATIC CAPACITY TYPE TOUCH SCREEN PANEL AND METHOD OF MANUFACTURING THE SAME

This application claims the benefit of Korea Patent Application No. 10-2010-0067942 filed on Jul. 14, 2010, the entire content of which is incorporated herein by reference for all purposes as if fully set forth herein.

BACKGROUND OF THE INVENTION

1. Field of the Invention

Embodiments of the invention relate to an electrostatic capacity type touch screen panel and a method of manufacturing the same.

2. Discussion of the Related Art

Display devices such as a liquid crystal display, an electroluminescent display, and a plasma display panel have been recently spotlighted because of fast response time, low power consumption, and excellent color reproduction. The display devices have been used in various electronic products such as TVs, computer monitors, notebook computers, mobile phones, refrigerator displays, personal digital assistants, and automated teller machines. An interface between the display devices and a user is generally configured using various input devices such as keyboards, mouses, and digitizers. However, the user has to learn how to use the input device such as the keyboard and the mouse, and the input device occupies a separate space. Further, it is difficult to handle the display devices because of the input device. Thus, a demand for the simple and convenient input devices capable of reducing a malfunction has been increasing day by day. A touch screen panel, to which the user inputs information while directly contacting the screen of the display device with his or her finger or a pen, was proposed to meet the demand.

The touch screen panel is a simple input device capable of reducing the malfunction and can input information without using a separate input device. Further, because the user can easily operate the touch screen panel through the contents displayed on the screen of the touch screen panel, the touch screen panel has been applied to the various display devices.

The touch screen panel may be classified into a resistive type touch screen panel, a capacitive type touch screen panel, and an electromagnetic type touch screen panel based on a method for sensing a touched portion of the touch screen panel. The resistive type touch screen panel senses the touched portion by a voltage grade depending on a resistance in a state where a DC voltage is applied to a metal electrode formed on an upper substrate or a lower substrate of the resistive type touch screen panel. The capacitive type touch screen panel senses the touched portion by forming an equipotential surface on a conductive layer and sensing a voltage change location of upper and lower substrates of the capacitive type touch screen panel based on a touch operation. The electromagnetic type touch screen panel senses the touched portion by reading an LC value induced by touching a conductive layer with an electronic pen.

A related art electrostatic capacity type touch screen panel is described below with reference to FIGS. 1 and 2. FIG. 1 is a plane view of a related art electrostatic capacity type touch screen panel. FIG. 2 is a cross-sectional view taken along lines I-I' and II-II' of FIG. 1.

As shown in FIGS. 1 and 2, the related art electrostatic capacity type touch screen panel includes an electrode forming part 20, a routing wiring part 40, a pad part 60, and a protective layer 50.

The electrode forming part 20 is formed on a substrate 10. The electrode forming part 20 includes a plurality of first electrodes 21 arranged parallel to one another in a horizontal direction (for example, an X-axis direction) and a plurality of second electrodes 22 that are arranged to cross the plurality of first electrodes 21 in a vertical direction (for example, a Y-axis direction). The plurality of first electrodes 21 and the plurality of second electrodes 22 cross each other, but are electrically insulated from each other by an insulating layer 30. The adjacent first electrodes 21 are connected to each other using a connection electrode 41. The connection electrode 41 connects the adjacent first electrodes 21 to each other through contact holes 30a and 30b formed in the insulating layer 30 covering upper parts of the first and second electrodes 21 and 22.

The routing wiring part 40 is formed outside the electrode forming part 20. The routing wiring part 40 includes a plurality of first routing wires 42 respectively connected to the plurality of first electrodes 21 and a plurality of second routing wires 43 respectively connected to the plurality of second electrodes 22.

The pad part 60 includes a plurality of first pads 61 respectively connected to the plurality of first electrodes 21 through the plurality of first routing wires 42 and a plurality of second pads 62 respectively connected to the plurality of second electrodes 22 through the plurality of second routing wires 43.

The protective layer 50 covers the electrode forming part 20 and the routing wiring part 40 and prevents the first and second electrodes 21 and 22 and the first and second routing wires 42 and 43 from being exposed to the outside.

A method of manufacturing the related art electrostatic capacity type touch screen panel is described below with reference to FIGS. 3A to 3D.

As shown in FIG. 3A, a deposition process such as a sputtering process is performed on a substrate 10 including an electrode forming part, a routing wiring part, and a pad part to deposit a first conductive layer for forming first and second electrodes on the entire surface of the substrate 10. An indium-tin-oxide (ITO) layer is generally used as the first conductive layer. A photoresist is coated on the entire surface of the substrate 10 on which the first conductive layer is formed. A photolithography process using a first mask is then performed on the substrate 10 to form a first photoresist pattern exposing the first conductive layer on the electrode forming part. A wet etching process is performed on the first conductive layer exposed by the first photoresist pattern to remove the first conductive layer. An ashing process is then performed on the remaining first photoresist pattern to form a plurality of first electrodes 21 and a plurality of second electrodes 22 crossing the first electrodes 21 on the substrate 10.

As shown in FIG. 3B, a first insulating layer 30 is formed on the substrate 10 on which the plurality of first and second electrodes 21 and 22 are formed. A photolithography process using a second mask and an etching process are then performed to remove the first insulating layer 30 of the routing wiring part and the first insulating layer 30 of the pad part and to form first and second contact holes 30a and 30b passing through the first insulating layer 30 of the electrode forming part. The first and second contact holes 30a and 30b expose a portion of each of the first electrodes 21 adjacent to the first and second contact holes 30a and 30b. The first insulating layer 30 may be formed of silicon nitride, silicon oxide, or an organic resin, etc.

As shown in FIG. 3C, the deposition process such as the sputtering process is performed on the entire surface of the substrate 10, in which the first and second contact holes 30a and 30b are formed, to form a second conductive layer. The second conductive layer may be formed of aluminum (Al) or molybdenum (Mo). A photoresist is coated on the entire surface of the substrate 10 on which the second conductive layer is formed. A photolithography process using a third mask and an etching process are then performed to form on first and second routing wires 42 and 43 of the routing wiring part on the substrate 10 and to form connection electrodes 41 on the first insulating layer 30 of the electrode forming part. The connection electrodes 41 connect the first electrodes 21 which are separated each other through the first and second contact holes 30a and 30b formed in the first insulating layer 30.

As shown in FIG. 3D, a second insulating layer 50 as a protective layer is formed on the entire surface of the substrate 10 on which the connection electrodes 41 and the first and second routing wires 42 and 43 are formed. A photolithography process using a fourth mask and an etching process are then performed to form through holes 50a, 50b, and 50c passing through the second insulating layer 50. The through holes 50a, 50b, and 50c expose the first and second routing wires 42 and 43 of the routing wiring part.

However, as described above, the related art electrostatic capacity type touch screen panel is manufactured through the four mask processes, and each of the four mask processes involves the photolithography process requiring a series of successive processes including a coating process, an alignment process, an exposure process, a development process, a cleaning process, etc. Therefore, it is required to solve an increase in time and cost required in the four mask processes.

SUMMARY OF THE INVENTION

Embodiments of the invention provide an electrostatic capacity type touch screen panel and a method of manufacturing the same capable of improving productivity by reducing the number of mask processes and tact time.

In one aspect, there is a touch screen panel comprising a substrate, an electrode forming part positioned on the substrate, the electrode forming part including a plurality of first electrode serials arranged parallel to one another in a first direction and a plurality of second electrode serials that are arranged to cross the plurality of first electrode serials, a routing wiring part positioned on the substrate outside the electrode forming part, the routing wiring part including a plurality of first routing wires respectively connected to the plurality of first electrode serials and a plurality of second routing wires respectively connected to the plurality of second electrode serials, a plurality of first connection patterns that are formed on the same level layer as the plurality of first and second routing wires to be separated from one another, and an insulating layer configured to insulate the plurality of first electrode serials and the plurality of second electrode serials at crossings of the plurality of first electrode serials and the plurality of second electrode serials, wherein each of the plurality of first electrode serials includes a plurality of first electrode patterns that are separated from one another, wherein each of the plurality of first electrode patterns is formed on opposite ends of the adjacent first connection patterns and on the substrate between the opposite ends, wherein the adjacent first electrode patterns are connected to each other using the first connection pattern.

In another aspect, there is a method of manufacturing a touch screen panel comprising a first process for forming a first conductive layer on a substrate, and patterning the first conductive layer to form a first conductive pattern including a plurality of first connection patterns, a plurality of first routing wires, and a plurality of second routing wires on the substrate, a second process for forming an insulating layer on an entire surface of the substrate, on which the first conductive pattern is formed, forming a photoresist pattern having a first height and a second height greater than the first height using a half tone mask, patterning the insulating layer using the photoresist pattern to expose first and second portions of each of the plurality of first connection patterns, forming a first insulating pattern on a central portion of each of the plurality of first connection patterns, and forming a second insulating pattern on the plurality of first routing wires, and a third process for forming a second conductive layer on the substrate on which the first and second insulating patterns are formed, and on the photoresist pattern, removing the photoresist pattern and the second conductive layer on the photoresist pattern using a lift-off process, and forming a second conductive pattern including a plurality of first electrode serials arranged parallel to one another in a first direction and a plurality of second electrode serials arranged parallel to one another in a second direction crossing the first direction, wherein each of the plurality of first electrode serials includes a plurality of first electrode patterns connected to one another using the plurality of first connection patterns, and the plurality of second electrode serials are arranged in a direction crossing the plurality of first electrode serials and includes a plurality of second electrode patterns connected to one another using a plurality of second connection patterns, wherein each of the plurality of first electrode patterns is formed on opposite ends of the adjacent first connection patterns and on the substrate between the opposite ends, wherein the pair of adjacent first electrode patterns are connected to each other through the first connection pattern.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE EMBODIMENTS

Figure 1:
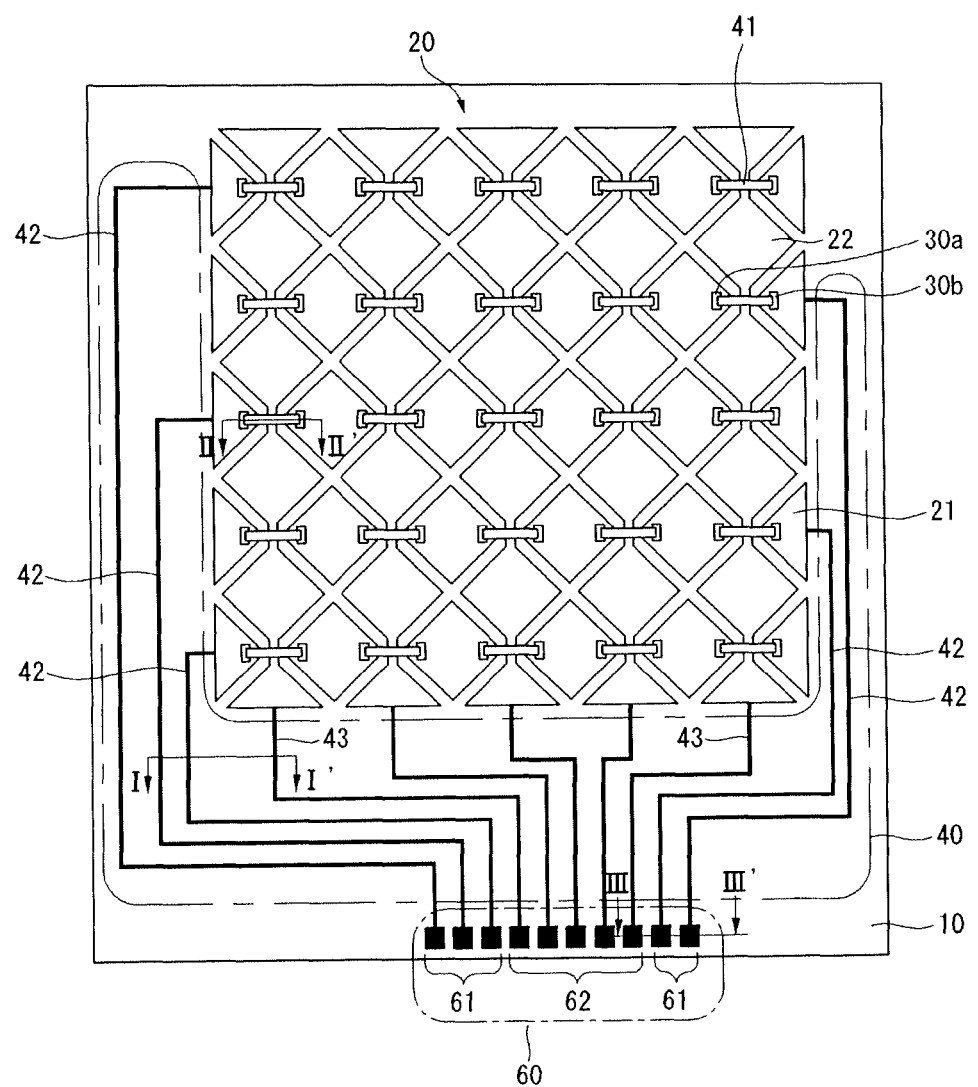
FIG. 1 is a plane view of a related art electrostatic capacity type touch screen panel.
Figure 2:
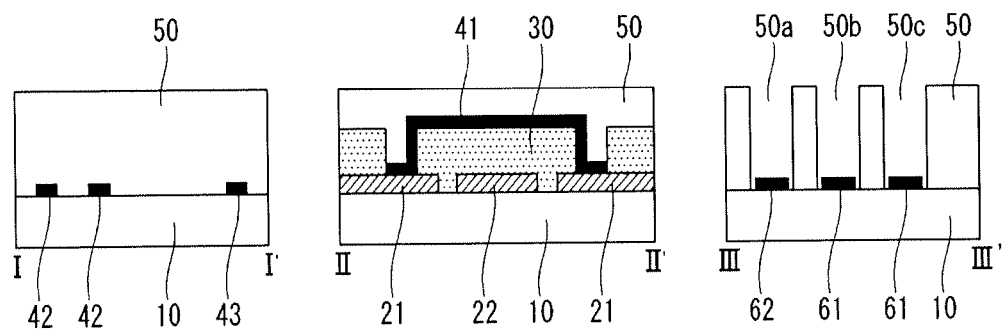
FIG. 2 is a cross-sectional view taken along lines I-I' and II-II' of FIG. 1.
Figure 3A:
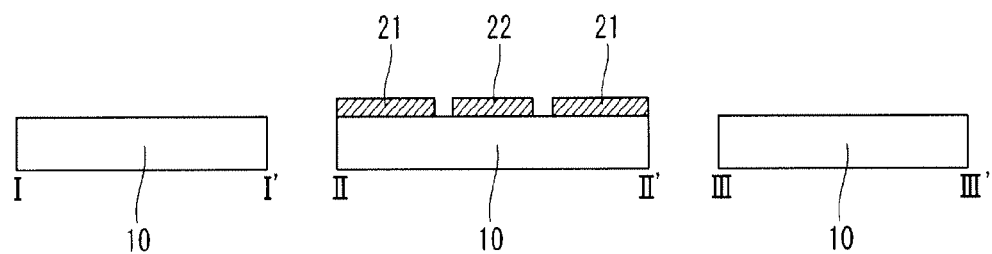
FIGS. 3A to 3D are cross-sectional views illustrating a method of manufacturing a related art electrostatic capacity type touch screen panel.
Figure 3B:
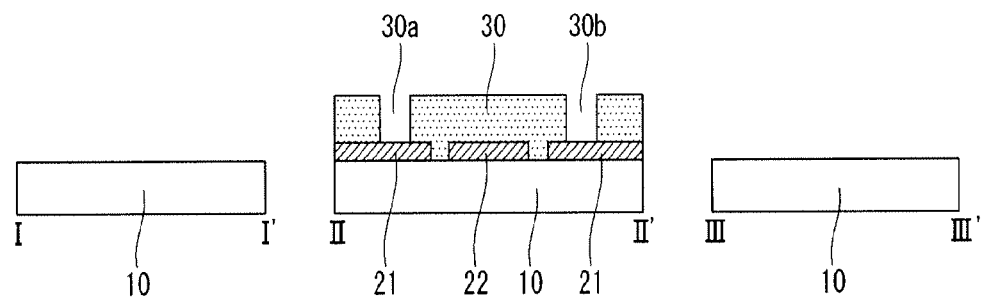
Figure 3C:
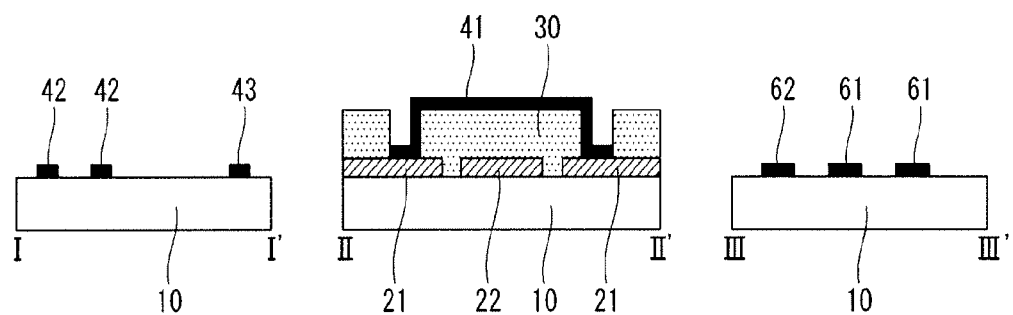
Figure 3D:
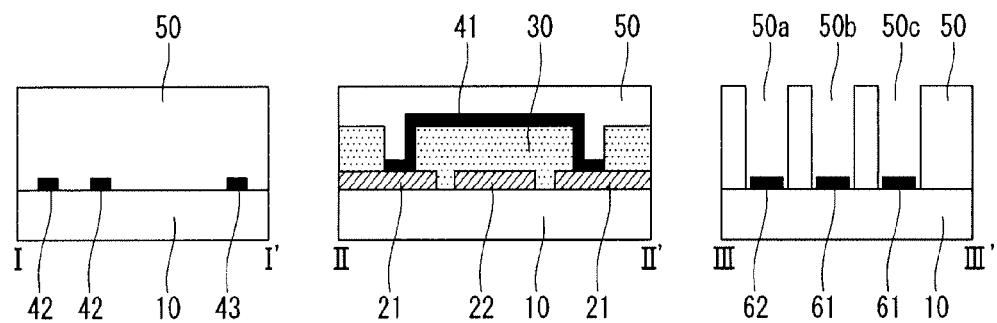

The invention will be described more fully hereinafter with reference to the accompanying drawings, in which example embodiments of the inventions are shown. Like reference numerals designate like elements throughout the specification.

Figure 4:
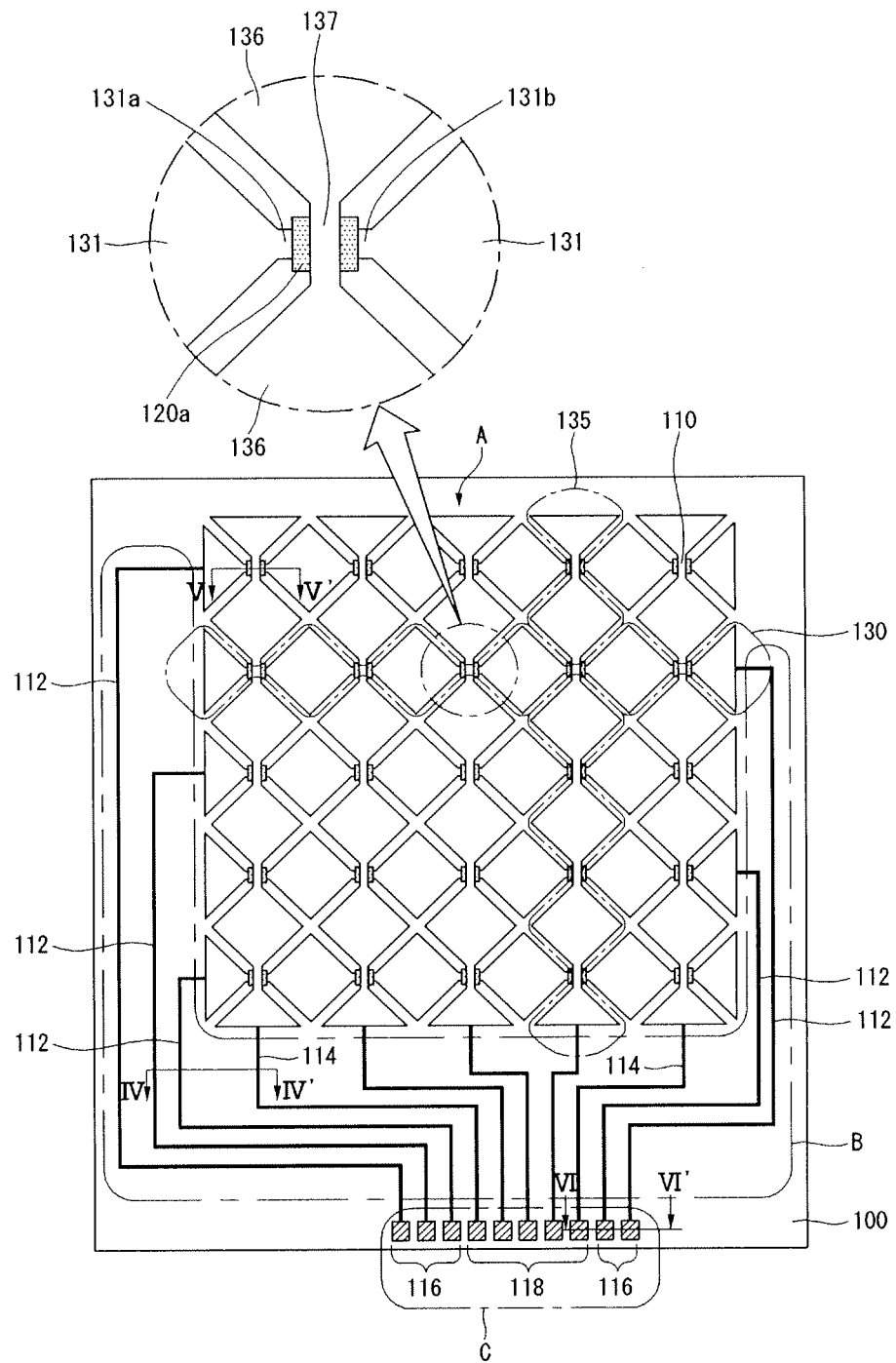
FIG. 4 is a plane view of an electrostatic capacity type touch screen panel according to an exemplary embodiment of the invention.
Figure 5:
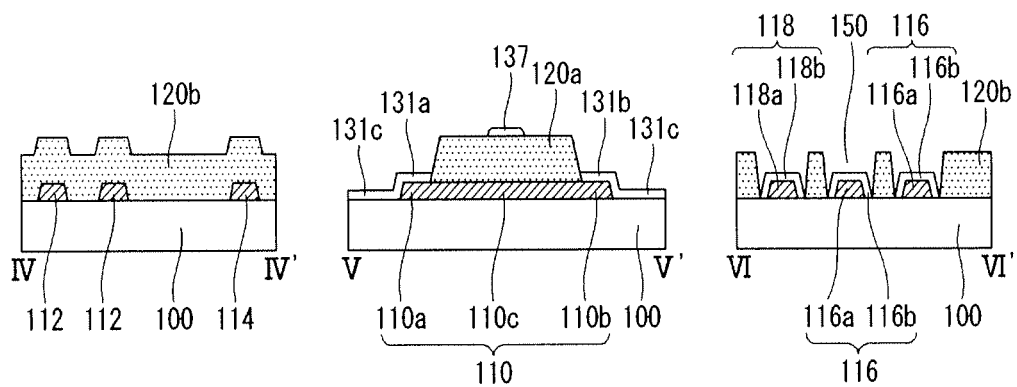
FIG. 5 is a cross-sectional view taken along lines IV-IV', V-V', and VI-VI' of FIG. 4.

An electrostatic capacity type touch screen panel according to an exemplary embodiment of the invention is described below with reference to FIGS. 4 and 5. FIG. 4 is a plane view of an electrostatic capacity type touch screen panel according to an exemplary embodiment of the invention. FIG. 5 is a cross-sectional view taken along lines IV-IV', V-V', and VI-VI' of FIG. 4.

As shown in FIGS. 4 and 5, the electrostatic capacity type touch screen panel according to the exemplary embodiment of the invention includes an electrode forming part A, a routing wiring part B, and a pad part C.

The electrode forming part A includes a plurality of first electrode serials 130 arranged parallel to one another in a first direction (for example, an X-axis direction) and a plurality of second electrode serials 135 that are arranged to cross the plurality of first electrode serials 130 in a second direction (for example, a Y-axis direction). Each of the plurality of first electrode serials 130 includes first electrode patterns 131 each having a shape of a triangle, a rectangle, a diamond, a polygon, etc. and first connection patterns 110 for connecting the first electrode patterns 131 to each other. Each of the plurality of second electrode serials 135 includes second electrode patterns 136 each having a shape of a triangle, a rectangle, a diamond, a polygon, etc. similar to the first electrode patterns 131 and second connection patterns 137 for connecting the second electrode patterns 136 to each other.

In the electrostatic capacity type touch screen panel according to the embodiment of the invention, the first connection pattern 110 is formed separately from the first electrode pattern 131, and the second connection pattern 137 and the second electrode pattern 136 form an integral body.

The routing wiring part B is formed outside the electrode forming part A. The routing wiring part B includes a plurality of first routing wires 112 respectively connected to the plurality of first electrode serials 130 and a plurality of second routing wires 114 respectively connected to the plurality of second electrode serials 135.

The pad part C includes a plurality of first pads 116 respectively connected to the plurality of first electrode serials 130 through the plurality of first routing wires 112 and a plurality of second pads 118 respectively connected to the plurality of second electrode serials 135 through the plurality of second routing wires 114.

In the electrostatic capacity type touch screen panel according to the embodiment of the invention, the first connection patterns 110, the first and second routing wires 112 and 114, lower layers 116a of the first pads 116, and lower layers 118a of the second pads 118 are formed on a substrate 100 through the same process using the same material. The first connection patterns 110, the first and second routing wires 112 and 114, and the lower layers 116a and 118a of the first and second pads 116 and 118 may be formed of Al, AlNd, Mo, MoTi, Cu, Cr, etc. Because each of the above materials has a low resistivity, the above materials may reduce a resistance of an electrode connection portion. Other materials may be used. Further, the first connection patterns 110, the first and second routing wires 112 and 114, and the lower layers 116a and 118a of the first and second pads 116 and 118 may be formed of different materials.

In the electrostatic capacity type touch screen panel according to the embodiment of the invention, because the first connection patterns 110 and the first and second routing wires 112 and 114 are formed through the same process, one mask process in the embodiment of the invention may be omitted compared with the related art, in which the connection patterns for connecting the electrode patterns and the routing wires are formed through the different processes. As a result, the manufacturing cost and tact time may be reduced.

In the electrode forming part A, a first insulating pattern 120a is formed on a central portion 110c of the first connection pattern 110, so as to expose a first portion 110a and a second portion 110b of the first connection pattern 110 and not to bring the first connection pattern 110 into contact with the second connection pattern 137 crossing the first connection pattern 110. The first electrode pattern 131 is formed on the substrate 100. More specifically, a first portion 131a of the first electrode pattern 131 is formed on the first portion 110a of the first connection pattern 110, and a second portion 131b of the first electrode pattern 131 is formed on the second portion 110b of the first connection pattern 110. Thus, the adjacent first electrode patterns 131 are electrically connected to each other through the first connection pattern 110.

Further, in the routing wiring part B, a second insulating pattern 120b is formed, so as to expose an end (not shown) of the first routing wire 112 and an end (not shown) of the second routing wire 114 that face the electrode forming part A. The second portion 131b of the first electrode pattern 131 on the outermost side of the electrode forming part A is formed on the exposed end of the first routing wire 112. A portion of the second electrode pattern 136 on the outermost side of the electrode forming part A is formed on the exposed end of the second routing wire 114 in the same manner as the first electrode pattern 131.

In the pad part C, as shown in FIG. 5, the second insulating pattern 120b having contact holes 150 exposing the first and second pads 116 and 118 is formed. Each of the first pads 116 includes a metal layer 116a formed on the substrate 100 and a transparent electrode layer 116b surrounding the metal layer 116a. Each of the second pads 118 includes a metal layer 118a formed on the substrate 100 and a transparent electrode layer 118b surrounding the metal layer 118a.

The first and second electrode patterns 131 and 136 and the second connection patterns 137 are formed using the same material through the same process. The first and second electrode patterns 131 and 136 and the second connection patterns 137 may be formed of a transparent conductive material such as indium tin oxide (ITO) and indium zinc oxide (IZO). When the first and second electrode patterns 131 and 136 and the second connection patterns 137 foamed on an uppermost layer of the electrostatic capacity type touch screen panel are formed of ITO, a scratch is not generated in a subsequent process for forming a display device on another surface of the substrate 100 because of a high hardness of ITO. Hence, the electrostatic capacity type touch screen panel having the good quality is obtained.

A method of manufacturing the electrostatic capacity type touch screen panel according to the exemplary embodiment of the invention is described below with reference to FIGS. 6A to 8C.

Figure 6A:
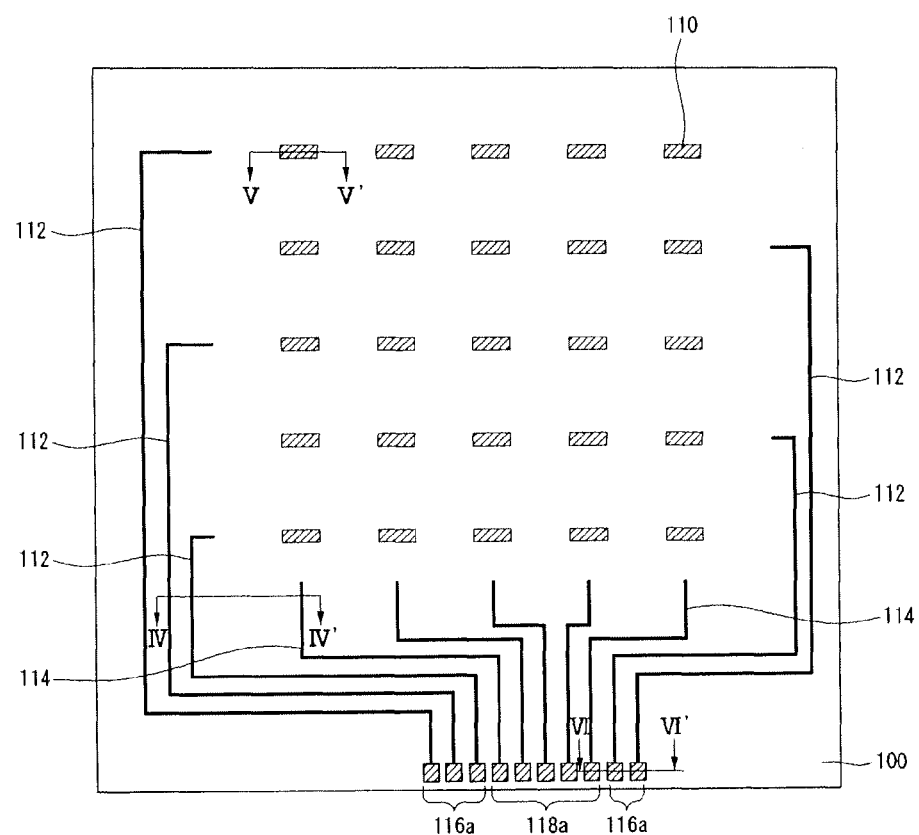
FIGS. 6A and 6B are a plane view and a cross-sectional view illustrating a first process in a method of manufacturing the electrostatic capacity type touch screen panel shown in FIG. 4, respectively.
Figure 6B:
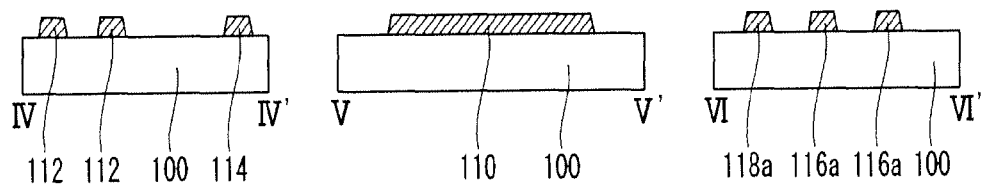

FIGS. 6A and 6B are a plane view and a cross-sectional view illustrating a first mask process in a method of manufacturing the electrostatic capacity type touch screen panel according to the exemplary embodiment of the invention, respectively.

As shown in FIGS. 4, 6A, and 6B, a first conductive pattern group including first connection patterns 110, first routing wires 112, second routing wires 114, lower layers 116a of first pads 116, and lower layers 118a of second pads 118 is formed on a substrate 10 including an electrode forming part A, a routing wiring part B, and a pad part C using the first mask process.

More specifically, a deposition process such as a sputtering process is performed on the substrate 100 to deposit a first conductive layer on the entire surface of the substrate 100. The first conductive layer is patterned through a photolithography process using the first mask process and an etching process. Hence, the first conductive pattern group including the first connection patterns 110, the first routing wires 112, the second routing wires 114, the lower layers 116a of the first pads 116, and the lower layers 118a of the second pads 118 is formed. The first conductive pattern group may be formed using Al, AlNd, Mo, MoTi, Cu, Cr, etc.

Alternatively, the first conductive pattern group may be formed on the substrate 100 using a printing method and then may be dried and heated. In this instance, the photolithography process using the first mask process and the etching process may be omitted. Other methods may be used for the first conductive pattern group.

Figure 7A:
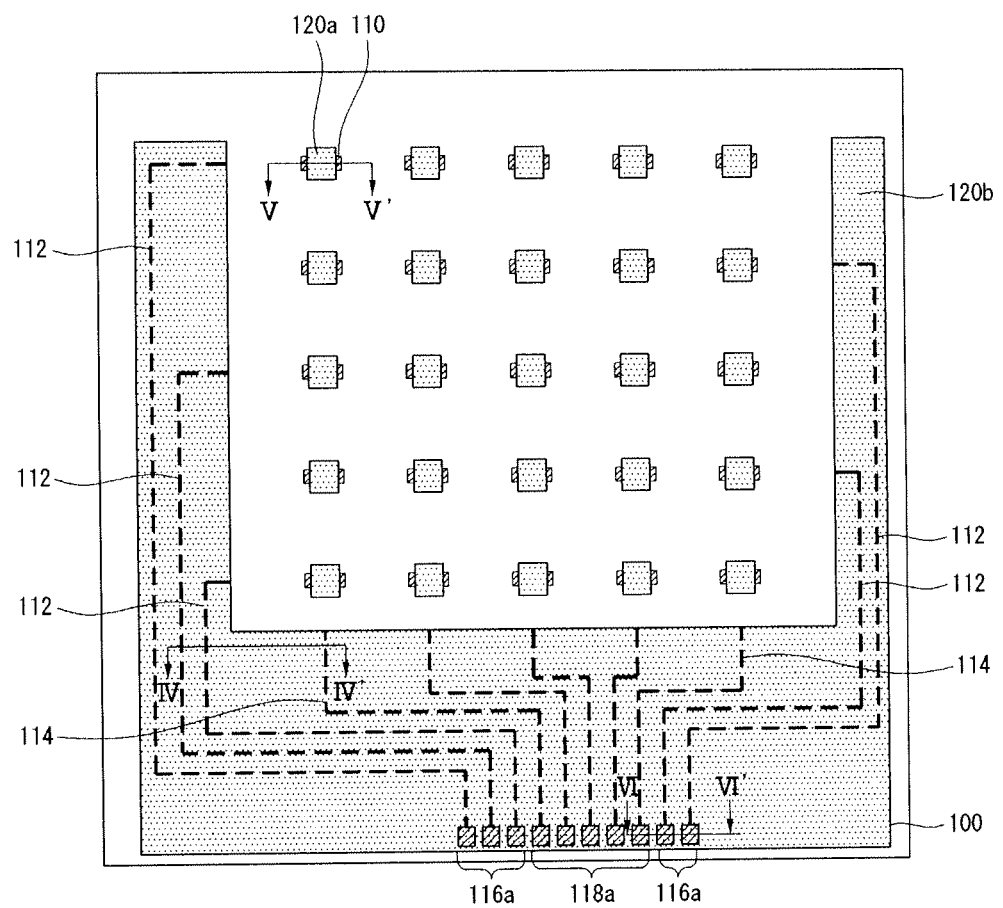
FIGS. 7A to 7E are plane views and cross-sectional views illustrating a second process using a halftone mask in a method of manufacturing the electrostatic capacity type touch screen panel shown in FIG. 4.

FIGS. 7A to 7E are plane views and cross-sectional views illustrating a second mask process in a method of manufacturing the electrostatic capacity type touch screen panel according to the exemplary embodiment of the invention. In FIG. 7A, because first and second routing wires 112 and 114 indicated by the dotted lines are covered by a second insulating pattern 120b, the first and second routing wires 112 and 114 are not substantially viewed from the plane view of FIG. 7A. However, the first and second routing wires 112 and 114 are indicated by the dotted lines in FIG. 7A for the convenience of understanding.

Figure 7B:
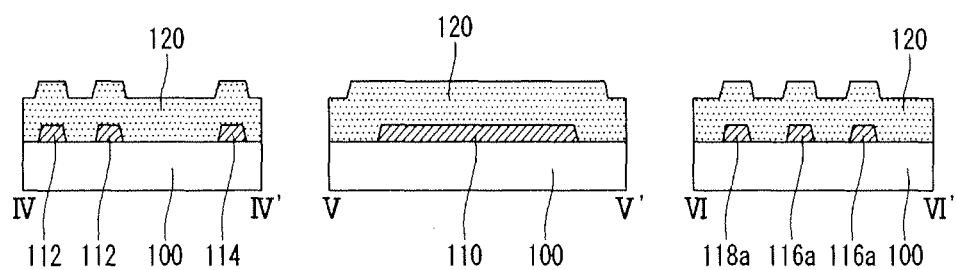

As shown in FIGS. 7A and 7B, an insulating layer 120 is formed on the entire surface of a substrate 10, on which a first conductive pattern group including first connection patterns 110, first routing wires 112, second routing wires 114, lower layers 116a of first pads, and lower layers 118a of second pads is formed, using a deposition process such as a sputtering process. The insulating layer 120 may be formed of an inorganic insulating material such as silicon nitride (SiNx) and silicon oxide (SiOx). Alternatively, an organic insulating material such as photoacrylic may be used for the insulating layer 120.

Figure 7C:
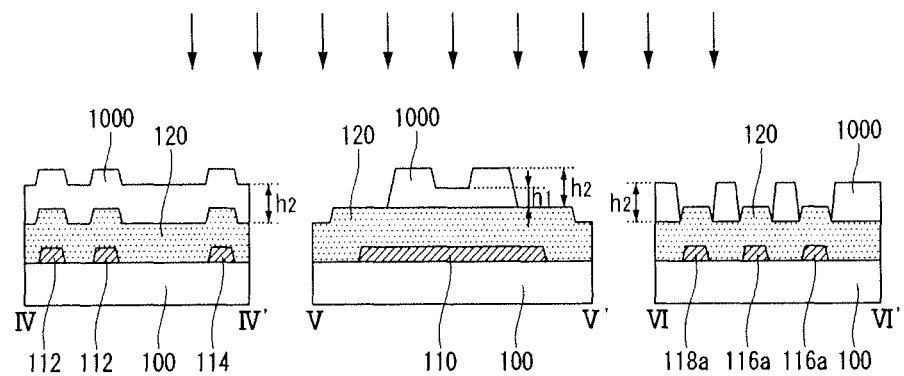

As shown in FIG. 7C, after the insulating layer 120 is formed, a photoresist pattern 1000 having a first height h1 and a second height h2 greater than the first height h1 is formed through a photolithography process using a half tone mask. The photoresist pattern 1000 is then positioned on an electrode forming part A, a routing wiring part B, and a pad part C. In the photoresist pattern 1000 positioned on the electrode forming part A, a portion having the first height h1 is disposed on the insulating layer 120 overlapping a central portion of the first connection pattern 110 in a longitudinal direction thereof, and a portion having the second height h2 is disposed on the insulating layer 120 overlapping portions extending from the central portion of the first connection pattern 110. The photoresist pattern 1000 is positioned on the insulating layer 120, so that the photoresist pattern 1000 does not overlap ends of the portions extending from the central portion of the first connection pattern 110. The portion of the photoresist pattern 1000 having the second height h2 is disposed on the routing wiring part B and the pad part C.

Figure 7D:
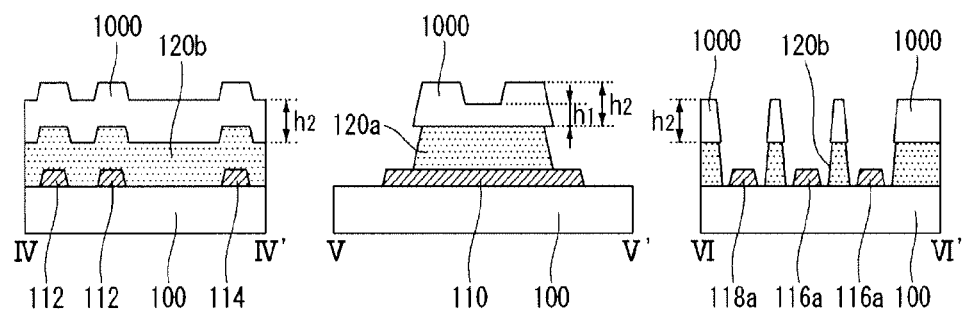

After the photoresist pattern 1000 is positioned on the insulating layer 120, the insulating layer 120 is exposed and developed using the photoresist pattern 1000 as a mask. The insulating layer 120 is then patterned through a wet etching process. Hence, as shown in FIGS. 7A and 7D, a first insulating pattern 120a and a second insulating pattern 120b are formed. In this instance, the insulating layer 120 may be over-etched so that the photoresist pattern 1000 is easily removed in a subsequent process. Hence, the first insulating pattern 120a and the second insulating pattern 120b may have an undercut structure.

Figure 7E:
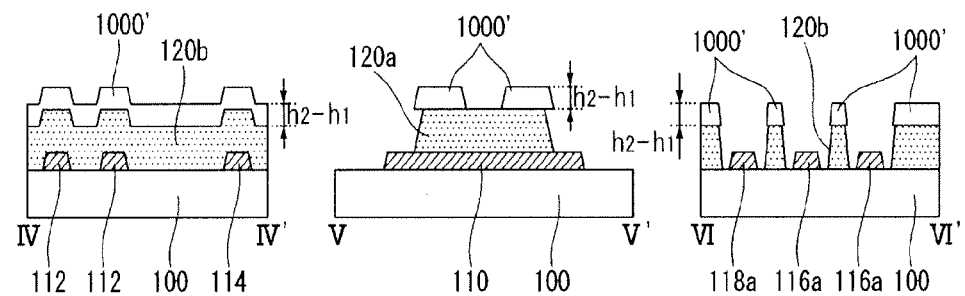

Next, as shown in FIG. 7E, the photoresist pattern 1000 is ashed by the first height h1, so that an upper surface of the first insulating pattern 120a is exposed through an ashing process using oxygen plasma. Hence, a photoresist pattern 1000' having a height (h2−h1) is formed.

Figure 8A:
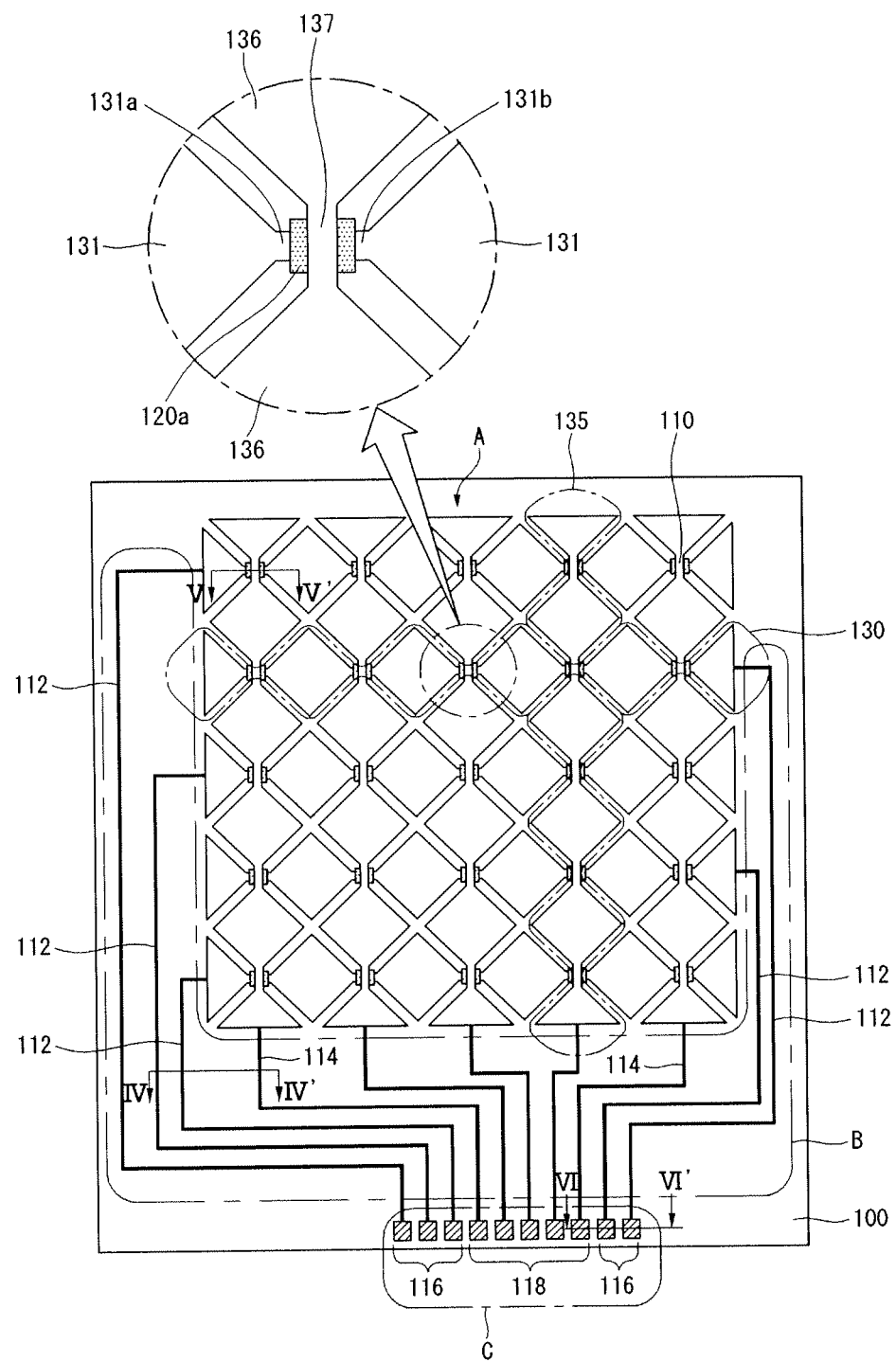
FIGS. 8A to 8C are plane views and cross-sectional views illustrating a third process in a method of manufacturing the electrostatic capacity type touch screen panel shown in FIG. 4.
Figure 8B:
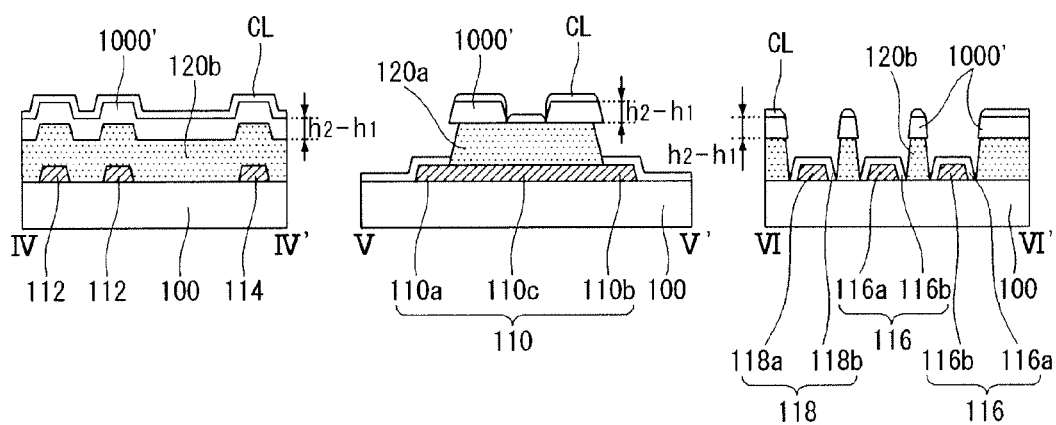
Figure 8C:
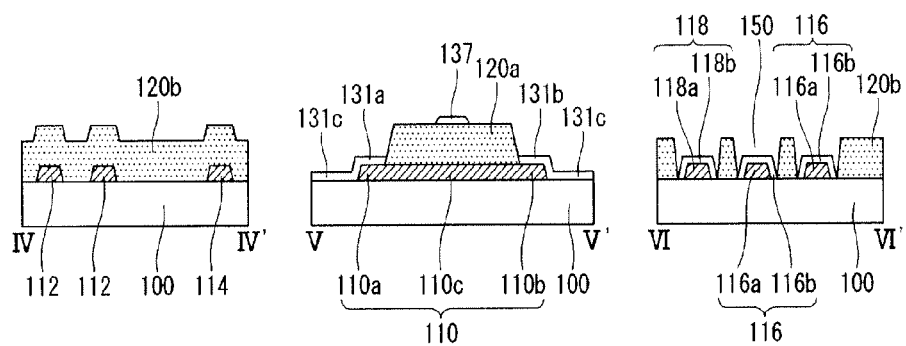

FIGS. 8A to 8C are a plane view and cross-sectional views illustrating a process for forming electrode serials in a method of manufacturing the electrostatic capacity type touch screen panel according to the exemplary embodiment of the invention. More specifically, FIG. 8A is the plane view of the electrostatic capacity type touch screen panel formed through the process for forming the electrode serials. The second insulating pattern 120b is omitted in FIG. 8A for the convenience of understanding.

As shown in FIGS. 8A and 8B, a second conductive layer CL is formed on the substrate 100, on which the first and second insulating patterns 120a and 120b are formed, and on the entire surface of the photoresist pattern 1000'.

As shown in FIG. 8C, the photoresist pattern 1000' and the second conductive layer CL on the photoresist pattern 1000' are removed through a lift-off process. Hence, as shown in FIG. 8A, a plurality of second conductive patterns including a plurality of first electrode serials 130 arranged parallel to one another in a first direction and a plurality of second electrode serials 135 arranged parallel to one another in a second direction crossing the first direction are formed.

More specifically, as shown in FIG. 8B, the second conductive layer CL is entirely deposited on the electrode forming part A on the substrate 100 on which the first connection patterns 110 and the first insulating pattern 120a are formed, the routing wiring part B in which the first and second routing wires 112 and 114 are formed, and the pad part C in which the lower layers 116a of the first pads 116, and lower layers 118a of the second pads 118 are formed, through a deposition process such as a sputtering process. Hence, the second conductive layer CL is formed on first and second portions 110a and 110b corresponding to both ends of the first connection pattern 110, an exposed portion of the substrate 100, an exposed portion of the first insulating pattern 120a, the lower layers 116a and 118a of the first and second pads 116 and 118, and the photoresist pattern 1000' through the deposition process.

Because the first insulating pattern 120a and the second insulating pattern 120b each have the undercut structure, the photoresist pattern 1000' and the second conductive layer CL on the photoresist pattern 1000' may be easily removed through the lift-off process without using the mask process. As shown in FIGS. 8A and 8C that are the plane view and the cross-sectional view of the electrostatic capacity type touch screen panel finally obtained after performing the lift-off process, the second conductive patterns including the plurality of first electrode serials 130 arranged parallel to one another in the first direction and the plurality of second electrode serials 135 arranged parallel to one another in the second direction crossing the first direction are formed. As shown in FIG. 8C, a second connection pattern 137 for connecting neighboring second electrode patterns 136 of the second electrode serial 135 is formed on the first insulating pattern 120a, and a first electrode pattern 131 is formed on a first portion 110a of one first connection pattern 110 and a second portion 110a of another first connection pattern 110 adjacent to the one first connection pattern 110. Therefore, the neighboring first electrode patterns 131 are electrically connected to each other through the first connection pattern 110. Further, because the photoresist pattern 1000' and the second electrode layer 130 on the photoresist pattern 1000' are removed through the lift-off process in the embodiment of the invention, the second connection patterns 137 are formed on the first insulating pattern 120a.

In the method of manufacturing the electrostatic capacity type touch screen panel according to the embodiment of the invention, because the first connection patterns 110, the first and second routing wires 112 and 114, and the lower layers 116a and 118a of the first and second pads 116 and 118 may simultaneously formed through one mask process, the number of mask processes may be reduced by one, compared with the related art. Further, because the photoresist pattern 1000 having the first and second heights h1 and h2 formed using the half tone mask is used to form the first and second insulating patterns 120a and 120b, an additional mask is unnecessary in the subsequent process for forming the first and second electrode serials 130 and 135. Accordingly, because the electrostatic capacity type touch screen panel according to the embodiment of the invention may be manufactured through the two mask processes, the number of mask processes may be reduced by two, compared with the related art.

The electrostatic capacity type touch screen panel according to the embodiment of the invention may be applied to a display device including a liquid crystal display (LCD), a field emission display (FED), a plasma display panel (PDP), an electroluminescence device (EL), an electrophoretic display (EPD), etc. In this instance, the substrate of the electrostatic capacity type touch screen panel according to the embodiment of the invention may be used as a substrate of the display device.

Although embodiments have been described with reference to a number of illustrative embodiments thereof, it should be understood that numerous other modifications and embodiments can be devised by those skilled in the art that will fall within the scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch screen panel comprising:
   a substrate;
   an electrode forming part positioned on the substrate, the electrode forming part including a plurality of first electrode serials arranged parallel to one another in a first direction and a plurality of second electrode serials arranged to cross the plurality of first electrode serials;
   a routing wiring part positioned on the substrate outside the electrode forming part, the routing wiring part including a plurality of first routing wires respectively connected to the plurality of first electrode serials and a plurality of second routing wires respectively connected to the plurality of second electrode serials;
   a plurality of first connection patterns that are formed on the same level layer as the plurality of first and second routing wires to be separated from one another; and
   an insulating layer configured to insulate the plurality of first electrode serials and the plurality of second electrode serials at crossings of the plurality of first electrode serials and the plurality of second electrode serials,
   wherein each of the plurality of first electrode serials includes a plurality of first electrode patterns that are separated from one another,
   wherein each of the plurality of first electrode patterns is formed on opposite ends of the adjacent first connection patterns and on the substrate between the opposite ends,
   wherein the adjacent first electrode patterns are connected to each other using the first connection pattern, and
   wherein the insulating layer includes a first insulating pattern configured to expose first and second portions of each of the first connection patterns and a second insulating pattern configured to expose a portion of each of the first routing wires and a portion of each of the second routing wires.

2. The touch screen panel of claim 1, wherein each of the first electrode patterns includes:
   a first portion configured to overlap the first portion of the first connection pattern;
   a second portion configured to overlap a second portion of another first connection pattern adjacent to the first connection pattern; and
   a central portion positioned on the substrate between the first and second portions of the first electrode pattern.

3. The touch screen panel of claim 1, further comprising a pad part including a plurality of first pads respectively connected to the plurality of first electrode serials through the plurality of first routing wires and a plurality of second pads respectively connected to the plurality of second electrode serials through the plurality of second routing wires,
   wherein each of the plurality of first and second pads has a double-layered structure including a lower layer and an upper layer.

4. The touch screen panel of claim 3, wherein the plurality of first connection patterns, the plurality of first and second routing wires, and the lower layers of the plurality of first and second pads are metal layers.

5. A method of manufacturing a touch screen panel comprising:
   a first process for forming a first conductive layer on a substrate, and patterning the first conductive layer to form a first conductive pattern including a plurality of first connection patterns, a plurality of first routing wires, and a plurality of second routing wires on the substrate;
   a second process for forming an insulating layer on an entire surface of the substrate, on which the first conductive pattern is formed, forming a photoresist pattern having a first height and a second height greater than the first height using a half tone mask, patterning the insulating layer using the photoresist pattern to expose first and second portions of each of the plurality of first connection patterns, forming a first insulating pattern on a central portion of each of the plurality of first connection patterns, and forming a second insulating pattern on the plurality of first routing wires; and
   a third process for forming a second conductive layer on the substrate on which the first and second insulating patterns are formed, and on the photoresist pattern, removing the photoresist pattern and the second conductive layer on the photoresist pattern using a lift-off process, and forming a second conductive pattern including a plurality of first electrode serials arranged parallel to one another in a first direction and a plurality of second electrode serials arranged parallel to one another in a second direction crossing the first direction, wherein each of the plurality of first electrode serials includes a plurality of first electrode patterns connected to one another using the plurality of first connection patterns, and the plurality of second electrode serials are arranged in a direction crossing the plurality of first electrode serials and includes a plurality of second electrode patterns connected to one another using a plurality of second connection patterns, wherein each of the plurality of first electrode patterns is formed on opposite ends of the adjacent first connection patterns and on the substrate between the opposite ends, wherein the pair of adjacent first electrode patterns are connected to each other through the first connection pattern.

6. The method of claim 5, wherein the first conductive pattern is formed using a photolithography process or a printing screen method.

7. The method of claim 5, wherein the second process includes:

forming the insulating layer on the entire surface of the substrate on which the first conductive pattern is formed;

forming the photoresist pattern having the first height and the second height on the insulating layer using the half tone mask;

patterning the insulating layer using the photoresist pattern to form the first insulating pattern exposing the first and second portions of each of the plurality of first connection patterns and to form the second insulating pattern exposing a portion of each of the plurality of first routing wires and a portion of each of the plurality of second routing wires; and ashing the photoresist pattern so that a portion of the photoresist pattern having the first height is removed to expose the insulating layer corresponding to the portion of the photoresist pattern having the first height.

8. The method of claim 7, wherein the third process includes:

entirely depositing the second conductive layer on an electrode forming part on the substrate on which the plurality of first connection patterns and the first insulating pattern are formed, and on a routing wiring part in which the first and second routing wires are formed, to form the first conductive layer on the first and second portions of each of the plurality of first connection patterns, an exposed portion of the substrate, an exposed portion of the first insulating pattern, and the photoresist pattern; and removing the photoresist pattern and the second conductive layer on the photoresist pattern using the lift-off process, to form the plurality of first electrode patterns on the first and second portions of each of the plurality of first connection patterns and the exposed portion of the substrate and to form the plurality of second connection patterns of the plurality of second electrode serials on the first insulating pattern.

9. The method of claim 7, wherein each of the first and second insulating patterns has an undercut structure.

* * * * *